(12) United States Patent
Rose

(10) Patent No.: US 6,963,180 B2
(45) Date of Patent: Nov. 8, 2005

(54) CONTROL APPARATUS FOR AN ILLUMINATING DEVICE

(75) Inventor: Michael Rose, Ormond Beach, FL (US)

(73) Assignees: Gerhard Suckfull, Niederlauer (DE); Siegesmund Rader, Bad Neustadt (DE); Winfried Huckmann, Hohenroth (DE)

( * ) Notice: Subject to any disclaimer, the term of this patent is extended or adjusted under 35 U.S.C. 154(b) by 94 days.

(21) Appl. No.: 10/658,147

(22) Filed: Sep. 8, 2003

(65) Prior Publication Data

US 2004/0212322 A1    Oct. 28, 2004

(30) Foreign Application Priority Data

Apr. 23, 2003   (DE)   ................................ 030 09 253

(51) Int. Cl.⁷ ............................................. H05B 37/00
(52) U.S. Cl. ....................... 315/360; 315/153; 362/227; 362/234
(58) Field of Search ................................ 315/360, 323, 315/324, 153; 362/234, 227

(56) References Cited

U.S. PATENT DOCUMENTS 4,492,896 A * 1/1985 Jullien ......................... 315/153
5,924,784 A * 7/1999 Chliwnyj et al. ........... 362/234

* cited by examiner

Primary Examiner—David Vu
(74) Attorney, Agent, or Firm—Stevens Law Group, P.C.

(57) ABSTRACT

The invention relates to a control apparatus for controlling one or more lamps or illuminating means, so then the control apparatus comprises a microprocessor circuit which is adapted to output an output signal for controlling or driving the one or more lamps or illumination means, whereas the controlling signal is either completely non-periodic or has a period duration which is so long that the signal cannot be perceived by the human viewer as periodic.

8 Claims, 5 Drawing Sheets

Figure 1:
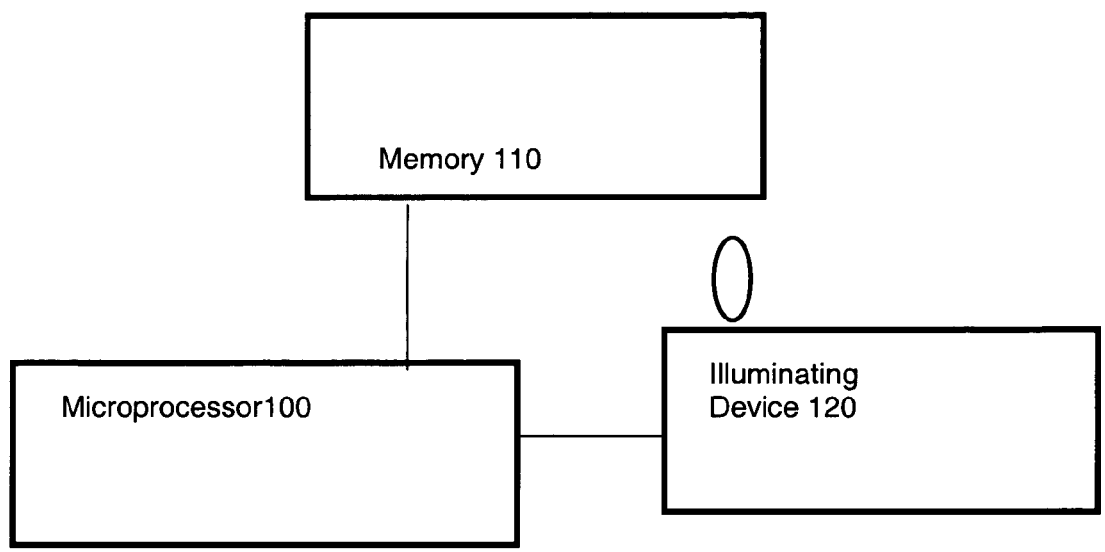

CONTROL APPARATUS FOR AN
ILLUMINATING DEVICE

CROSS REFERENCE TO RELATED
APPLICATION

This application claims priority from European Patent Application No. EP 03009253.0 filed Apr. 23, 2003, and entiled "Control Apparatus for an Illuminating Device".

FIELD OF THE INVENTION

The present invention relates to a control apparatus for controlling one or more lamps or lights or illuminating devices.

BACKGROUND ART

Control apparatuses for lamps or illuminating devices are known since a long time, whereas depending on the environmental conditions and the desired results, quite different control apparatuses or control devices may be used. The used devices ranged from a simple switch with which a lamp can be switched on and off up to a relatively complex control apparatus, for example for colouring organs in discos or theatres or the like, where depending on parameters from the outside a control of the lamps or lights is executed.

Based on this prior art it is an object of the present invention to provide a control apparatus for controlling one or more lamps or illuminating devices which gives the viewer the impression as if the lamp or illuminating device would "flare" or "flicker" in a natural manner, like e.g. a natural candle or fire.

SUMMARY OF THE INVENTION

The object of the invention is achieved by providing a control apparatus having a microprocessor circuit, the output signal of which is either completely a-periodic or has a period duration which is so long that the human viewer can not recognize the periodicity of the controlling signal.

With such a control apparatus a "natural" flickering effect can be achieved which gives the viewer the impression that the lamp or the illuminating device would "flicker" like a candle in the wind.

With such a control apparatus it becomes possible to drive or control electronic candles in a particularly preferable manner, for example in the form of a table candle, hurricane lamp, or a grave light. For the viewer the impression of a natural flickering in the wind is thereby achieved, so that it is almost impossible to distinguish between the electronic light and natural candle light. This is particularly the case if due to the particular form of the illuminating device—for example as a hurricane lamp or as a grave light—even in case of a natural candle the flame itself could not be recognized but only the flickering of the light generated by it could be seen.

According to a preferred embodiment, the microprocessor circuit is controlled by a corresponding program which includes a repeating loop in which according to a predetermined pattern a register of the microprocessor takes on different values. Always if the register values take on certain predefined values the illuminating device is switched on for a time corresponding to the value stored in the register.

With such a control circuit a flickering effect can be achieved in a particularly easy manner.

Preferably the register values, at which a control is carried out such as to switch on the illuminating device, are selected such that the control apparatus achieves an as much of an impression of "irregularity" as possible to the viewer. Thereby the impression of a "flickering effect" can be achieved in a particularly effective manner.

According to a preferred embodiment a register value changes from a basic value to a threshold value in predetermined intervals, whereas at each predetermined intermediate step a differential value between the present register value and a corresponding predefined value is calculated. The difference value then is used to control the time period for which the illuminating device is switched on.

In this manner the irregular effect of the outputted control signal can be achieved in a particularly easy manner by selecting the intermediate values at which the difference value is calculated as well as by selecting the values to be subtracted such that a regular or periodic impression of the controlling signal can be avoided.

According to a further preferred embodiment the irregular or non-periodic impression of the controlling signal is generated by using a random number generator which repeatedly generates random numbers which then are used for defining the time period for which the illuminating device is switched on. In this manner the impression created by a periodic controlling signal can be completely avoided.

According to a further preferred embodiment the controlling apparatus comprises a plurality of output terminals for controlling a plurality of illuminating devices. Thereby even complex illuminating apparatuses with a plurality of illuminating units can be formed, such as for advent wreaths, garlands, etc.

It is particularly preferable if for the plurality of output terminals loops for controlling the illuminating devices are provided which are respectively independent of each other so that for all illuminating devices the impression of a non-periodic controlling is achieved.

According to a further preferred embodiment the controlling apparatus comprises a selection means for selecting the frequency of occurrence with which the illuminating devices are switched on or off. This can be achieved for example by varying the clock frequency with which the loop is followed. This variation of the clock frequency may depend on the input from the user. Thereby a relatively quick repetition of the loop (short period duration) or a slow repetition of the loop (long time period duration) can be achieved.

According to a further preferred embodiment the control apparatus comprises a brightness sensor or a light intensity sensor depending on the output signal of which the control apparatus either drives the illuminating devices or not. Thereby it becomes possible to avoid the driving or controlling of the illuminating devices in such environmental areas where it is extremely bright so that the illuminating device would not be noticed anyway. Thereby electrical energy can be saved which is preferred if the device receives its power supply from a battery.

According to a further preferred embodiment the control apparatus comprises a switch for selecting one or more of the illuminating devices which are to be controlled by the control apparatus. In this manner an illuminating device which consists of a plurality of individual illuminating units can be operated in a variable way.

The present invention will now be described in detail in connection with the accompanying drawings.

FIG. 1 illustrates schematically a circuit according to an embodiment of the present invention.

Figure 2:
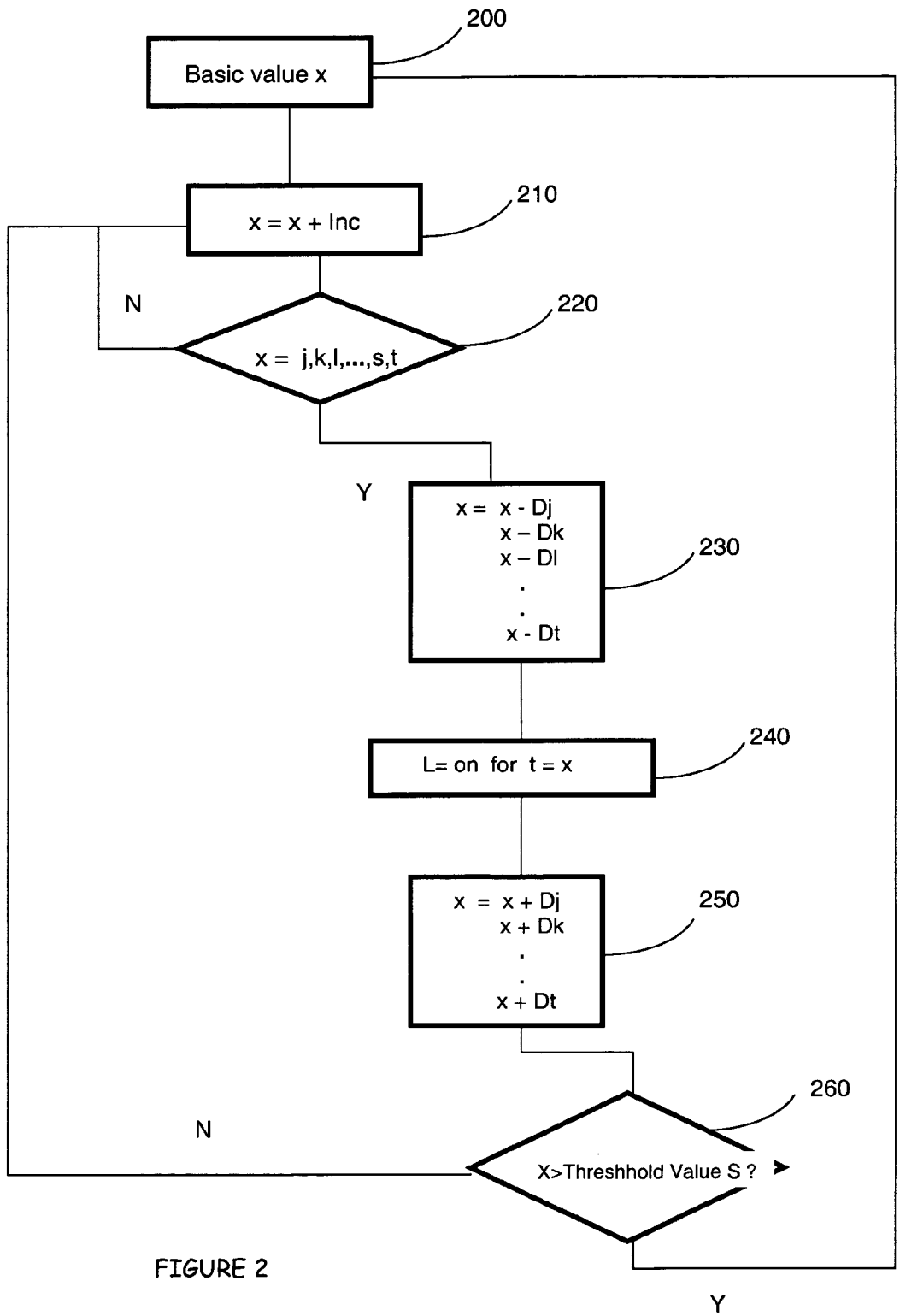

FIG. 2 schematically illustrates a flowchart for a controlling method according to an embodiment of the present invention.

Figure 3:
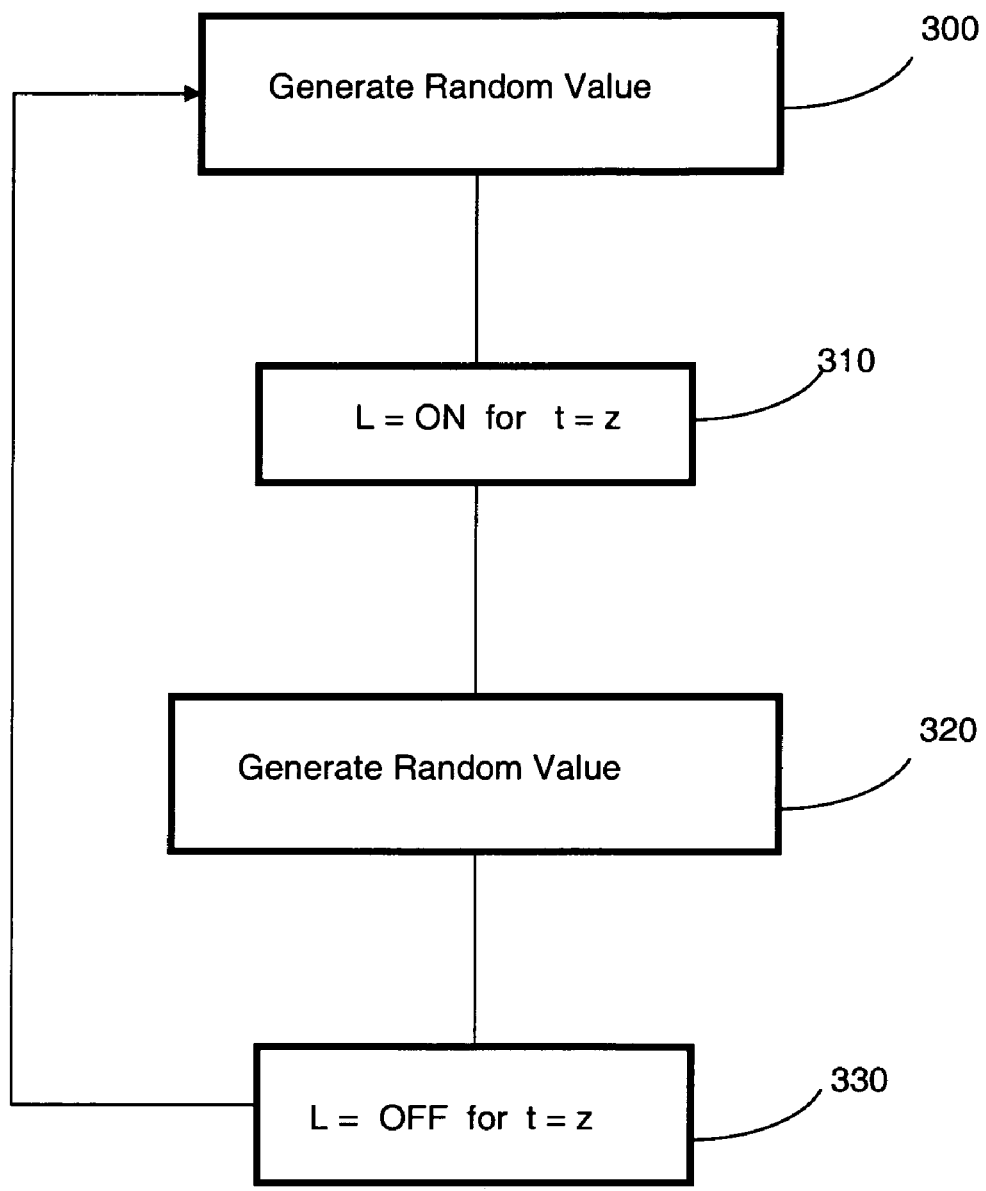

FIG. 3 schematically illustrates a flowchart for a controlling method according to a further embodiment of the present invention.

Figure 4:
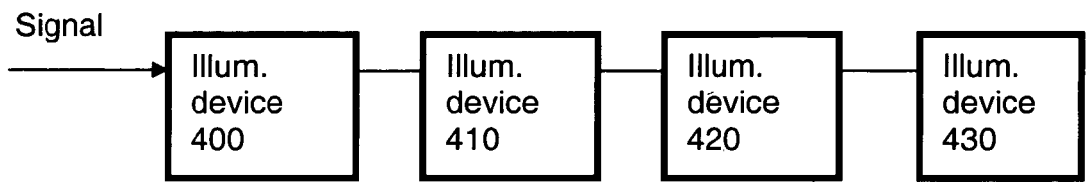

FIG. 4 schematically illustrates a further embodiment of the present invention.

Figure 5:
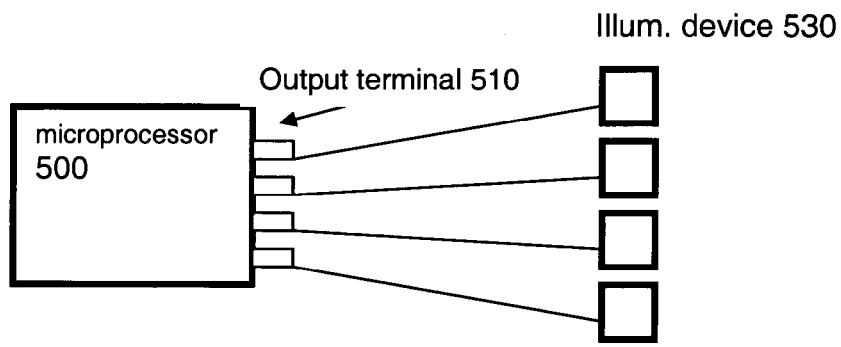

FIG. 5 schematically illustrates a further embodiment of the present invention.

Figure 6:
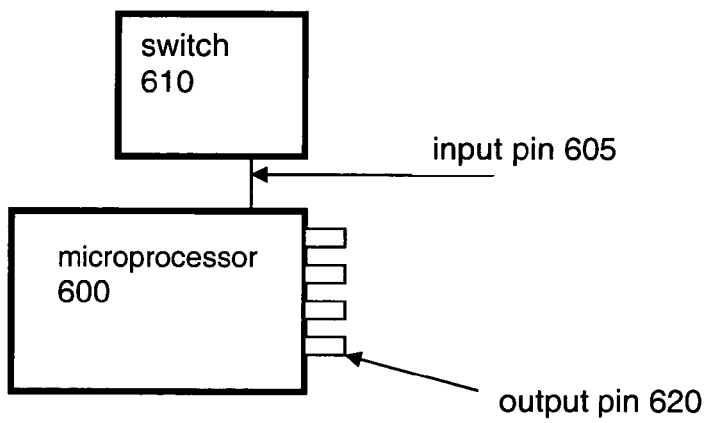

FIG. 6 schematically illustrates an even further embodiment of the present invention.

Figure 7:
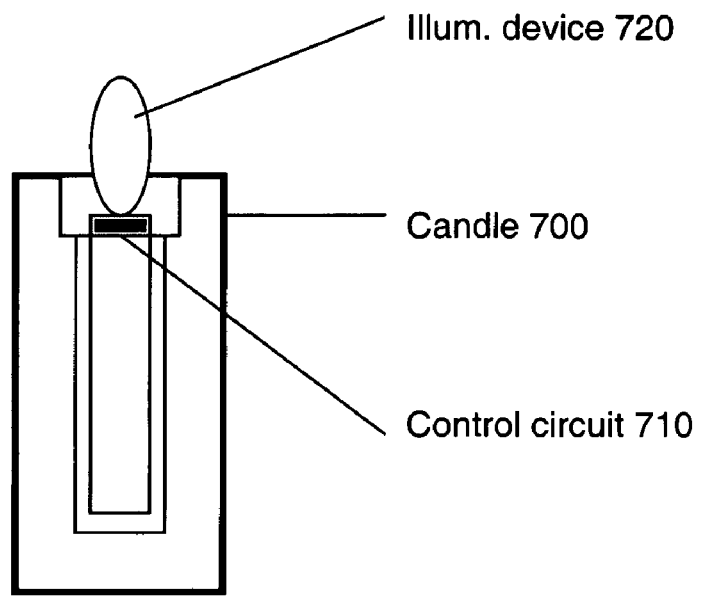

FIG. 7 schematically illustrates an embodiment of an illuminating apparatus according to a further embodiment of the present invention.

Figure 8:
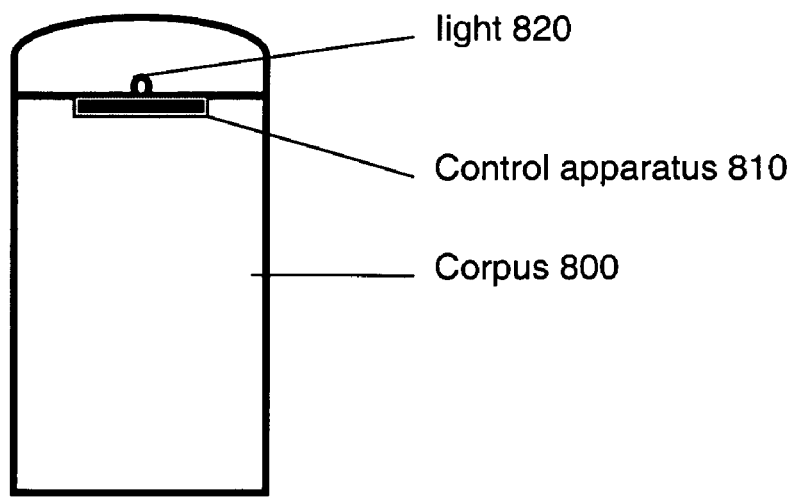

FIG. 8 schematically illustrates an embodiment of an illuminating apparatus according to a further embodiment of the present invention.

DETAILED DESCRIPTION

FIG. 1 schematically illustrates a circuit according to an embodiment of the invention. The microprocessor 100 is operated according to a program which is stored in memory 110. Based on this program and by means of an output terminal 115 of microprocessor 100 an illuminating device 120 is driven and controlled. The illuminating device may for example be a light emitting diode LED, an electric bulb, a halogen lamp, or the like. The microprocessor outputs a control signal to its output terminal 115 which either takes the value "1" or "0".

Depending there-upon the illuminating apparatus 120, which may comprise further an additional power supply circuit, is switched on and off.

The control procedure itself now will be described with respect to FIG. 2. FIG. 2 schematically illustrates a flowchart of a program which can be used for controlling illuminating device 120.

The program in principle is designed as a loop. Starting from a basic value X (operation 200) this value in operation 210 is incremented by an incrementing value $I_{nc}$. The incrementing value here may be "1", it may, however, also take an other value.

In operation 220 it is then examined whether the incremented X-value takes one of a plurality of predefined values. If this is the case, then a value corresponding to the X-value is subtracted from the X-value. By way of example let us assume that X assumes intermediate value j. Then the result in operation 220 is "yes", and a value $D_j$ which is to be subtracted from j is fetched, for example from a lookup table. After the subtraction ($j-D_j$) has been carried out there is a resulting value which then is stored in the register (operation 230). In operation 240 this value is used for controlling the illuminating device. For that purpose an output signal or a corresponding value in microprocessor L is set to "1". This is done for a time t which corresponds to value X. Thereafter the subtraction in operation 250 is reversed again by adding again $D_j$ to the value X in the register.

In the decision operation 260 is then checked as to whether in the meantime the loop has reached the threshold value S. If this is not the case, then it is returned to operation 210 and the next incrementing step is carried out. By repeating this loop, always if the value X assumes one of the predefined values j, . . . , t, a corresponding difference value is formed and the illuminating device is switched on.

However, if the threshold value S is reached, then the loop returns to the starting point 200, i.e. the register value X is again initialized to its basic value.

With such a program a flickering effect which gives a very natural impression can be achieved in a relatively easy manner. This becomes possible by selecting the values $D_j$, $D_k$, . . . , $D_s$, $D_t$ which are to be subtracted in such a manner that the resulting difference value (after this subtraction) or the difference values which are obtained by going through the loop give an impression which is as irregular as possible. It is decisive that the values are chosen such that a periodic impression is avoided.

Avoiding the periodicity can be achieved relatively easily by selecting the values to be subtracted in a suitable manner, although the register value X which is assumed at the beginning and the end of the loop, respectively, is periodic. A periodic impression can be avoided by suitably selecting the values to be subtracted, although the initial value X by simple incrementation increases from a basic value to a threshold value. This operation of simply going through the loop thereby is interrupted by the subtraction of the irregularly selected or subtraction values. Thereby an irregular, non-periodic signal which leads to a natural flickering effect can be obtained.

A further example of a program for controlling the illuminating device is schematically illustrated in FIG. 3 in the form of a flowchart. Thereby it is assumed that the microprocessor circuit is capable of generating random numbers, either by a built-in function or by an additional random number generator connected to the microprocessor.

In operation 300 a first random number value Z is generated. Then for a time t which corresponds to this random value the output terminal by which the illuminating device is driven is set to "1" (operation 310).

Then in operation 320 further random number Z is generated, in operation 330 the illuminating device is then switched off for the corresponding value t. This means that the output terminal is set to "0" for the time t. Thereafter the loop returns back to the starting point (operation 300).

FIG. 4 illustrates schematically the serial connection of several illuminating devices 400, 410, 420 and 430. All are commonly controlled by a single controlling signal. This may be meaningful in the case where the illuminating device takes the form of, for example, an advent wreath where all four candles should be driven in the same manner.

A further embodiment is schematically illustrated in FIG. 5. In this embodiment a microprocessor 500 is provided which has a plurality of output terminals 510. An illuminating device 530 may be connected to each of these output terminals, and the illuminating devices are then driven by output signals which are generated based on controlling loops which are respectively independent from each other and operate as described in connection with FIG. 2.

According to the embodiment shown in FIG. 6 the microprocessor 600 comprises an input pin 605 which is connected to a switch 610. Depending on the number of times with which the switch or button 610 is pressed, one or more output pins 620 of the microprocessor are controlled and driven in a manner independent of one another, i.e. for each of the output pins 620 of the microprocessor a separate controlling loop is running as it was described in connection with FIG. 2 or FIG. 3.

It should be mentioned here that, depending on the circumstances, such a controlling apparatus which generates a plurality of output signals independent from each other can also be used to control the candles of a advent wreath so that the candles are flickering independent of each other.

The illuminating devices which are controlled and driven by the control apparatus can themselves take very different forms and shapes. According to an embodiment the illuminating device takes the shape of a candle like schematically illustrated in FIG. 7. The candle 700 thereby in its inner part comprises the control circuit 710 which drives and controls the illuminating device 720 which may for example be an LED. Also the battery which powers the control circuit 710 is thereby preferably incorporated in the corpus of the candle.

It should further be mentioned that the fact that the control circuit outputs a non-periodic and irregular signal leads to the effect that energy and current are saved when driving the illuminating device. This means that for example electronic illumination systems can be more easily driven and powered by batteries, much more easily than if the illumination systems would be either permanently switched on or just "blinking" in a simple and regular manner. With a control and driving mechanism and apparatus according to the embodiments of the present invention a significant energy and current saving effect can be achieved, and thereby a battery power supply for many illumination systems and devices becomes possible.

A further embodiment of the present invention is schematically illustrated in FIG. 8. FIG. 8 thereby shows an illumination apparatus which comprises a control apparatus 810 according to an embodiment of the present invention, whereas the illumination device takes the form of an electronic grave light. Since the light 820 itself in case of such a grave light is covered and surrounded by a corpus 800 or a semi-transparent cover, in such a case an extremely natural "flickering effect" can be achieved.

Further embodiments may comprise for example the electronic illumination devices in form of light chain, as electronic garlands, or as table lamp, whereas in all of these cases control apparatuses according to embodiments of the present invention can be connected to these illumination devices. According to further examples the illumination apparatuses could also take the form of under-water lights, electronic open fires or chimney fires, or an electronic torch. For the purpose of light design in rooms they may also be attached to roofs or walls, or they may be attached to objects like for example pieces of furniture. As a further use one could consider embodiments in the form of merchandising objects such as displays, or postcards having an illuminating device mounted thereupon, or the like.

What is claimed is:

1. Control apparatus for controlling one or more lamps or illuminating devices such as to achieve a natural flickering effect, whereas the control apparatus comprises:
    a microprocessor circuit which is adapted to output an output signal for controlling or driving the one or more lamps or illumination devices, whereas the controlling signal is either completely non-periodic or has a period duration which is so long that the signal cannot be perceived by the human viewer as periodic; and
    a repeating loop which runs in the microprocessor circuit, whereas in said loop a register of said microprocessor assumes different values according to a predefined pattern, whereas if the register value assumes certain predefined values the illumination means is switched on for a time period corresponding to the respective register value.

2. The control apparatus of claim 1, whereas the register values for which a control such as to switch on the illumination means are selected such that an irregular impression is generated on the side of a viewer.

3. The control apparatus of claim 1, whereas the loop comprises:
    a repeated incrementation of a register value from a basic value to a threshold value, whereas at predefined intermediate values of the register value a difference value between the register value and a further predefined value corresponding to the predefined intermediate register value is calculated, whereas the difference value resulting from the subtraction then is used for controlling the time period for which the illumination means is switched on.

4. The control apparatus of claim 1, which further comprises:
    a plurality of output terminals for controlling a plurality of illumination means.

5. The control apparatus of claim 4, further comprising:
    a plurality of loops carried out by said microprocessor for controlling a plurality of illumination means independently from each other.

6. The control apparatus of claim 1, further comprising:
    a selector unit for selecting the frequency of occurrence or the number of times within a certain period of time for which the one or more illumination devices are switched on and switched off.

7. The control apparatus of claim 1, further comprising one or more of the following elements:
    a brightness sensor outputting a signal depending on which the control apparatus either drives and/or controls the illumination means or stops operation;
    a switch for switching the control apparatus on and off;
    a switch for selecting one or more of the illumination devices to be controlled.

8. An electronic illumination system comprising:
    a control apparatus according to claim 1;
    at least one illumination device controlled by said control apparatus, whereas said illumination means takes one of the following forms:
    an electronic candle;
    an electronic gravelight;
    a light chain;
    an electronic garland;
    a table light;
    an underwater light;
    an electronic chimney fire;
    an electronic open fire;
    an electronic torch.

\* \* \* \* \*